United States Patent
Estrada (10) Patent No.: US 11,985,963 B2
(45) Date of Patent: May 21, 2024

(54) DUAL RELEASE ROLLER CLIP FOR KITE FISHING

(71) Applicant: CERBERUS FISHING SYSTEMS INC., Pembroke Pines, FL (US)

(72) Inventor: Anthony S. Estrada, Pembroke Pines, FL (US)

(73) Assignee: Cerberus Fishing Systems, Inc., Pembroke Pines, FL (US)

( * ) Notice: Subject to any disclaimer, the term of this patent is extended or adjusted under 35 U.S.C. 154(b) by 108 days.

(21) Appl. No.: 17/340,360

(22) Filed: Jun. 7, 2021

(65) Prior Publication Data
US 2022/0386578 A1  Dec. 8, 2022

(51) Int. Cl.
*A01K 91/047* (2006.01)
*A01K 91/18* (2006.01)

(52) U.S. Cl.
CPC ............ *A01K 91/047* (2013.01); *A01K 91/18* (2013.01)

(58) Field of Classification Search
CPC ...... A01K 91/03; A01K 91/047; A01K 91/18; A01K 97/00; A01K 99/00
USPC ...................................................... 43/4, 17.2
See application file for complete search history.

(56) References Cited

U.S. PATENT DOCUMENTS

| | | | |
|---|---|---|---|
| 3,478,984 A * | 11/1969 | Landsem | H02G 1/08 242/154 |
| 3,905,148 A * | 9/1975 | Naone | A01K 91/08 43/43.12 |
| 3,930,330 A | 1/1976 | Black | |
| 4,069,611 A * | 1/1978 | Dusich | A01K 91/08 43/43.12 |
| 4,417,414 A * | 11/1983 | Hood | A01K 91/08 43/43.12 |
| 4,430,823 A * | 2/1984 | Henze | A01K 91/08 43/43.12 |
| 4,469,296 A * | 9/1984 | Lee | A01K 91/06 43/43.12 |
| 4,574,516 A * | 3/1986 | Shedd | A01K 91/08 43/43.12 |
| 4,611,423 A * | 9/1986 | Rupp | A01K 91/08 43/43.12 |
| 4,700,505 A * | 10/1987 | Weber | A01K 91/08 43/43.12 |
| 4,974,359 A * | 12/1990 | Zajic | A01K 91/08 43/43.12 |

(Continued)

FOREIGN PATENT DOCUMENTS

WO    WO 96/19109    *  6/1996

*Primary Examiner* — David J Parsley
(74) *Attorney, Agent, or Firm* — Kevin H. Fortin, Esq (57) ABSTRACT

A clip for attaching a fishing line to a kite line. The clip mounts on the housing for loosely supporting the fishing line. The clip includes a pair of top rollers and a bottom roller aligned in parallel during operation. The rollers rotate freely to prevent twisting of the kite line. The rollers do cooperate to hold the kite line and prevent axial motion between the kite line and the rollers of the clip. The clip is moveable between a locked configuration where the clip is secured axially to the fishing line and is capable of holding the fishing line, to an unlocked configuration that releases the fishing line. When bait at one end of the fishing line is hit or tugged, the clip releases both the fishing line and the kite line to enable the clip to slid down the kite line away from the kite and fishing line.

9 Claims, 8 Drawing Sheets

(56) References Cited

U.S. PATENT DOCUMENTS

| | | | |
|---|---|---|---|
| D381,390 S | 7/1997 | Stotesbury | |
| 7,178,284 B2* | 2/2007 | Chamberlain | A01K 91/08 43/43.12 |
| 8,141,228 B2* | 3/2012 | Gois, Sr. | A01K 75/00 43/14 |
| 8,359,719 B2* | 1/2013 | Jang | F16B 45/027 43/14 |
| 8,695,271 B1* | 4/2014 | Ehlers | A01K 91/08 43/43.12 |
| 9,267,535 B2* | 2/2016 | Jang | F16B 45/02 |
| 10,881,092 B2* | 1/2021 | Rosher | A01K 91/00 |
| 2014/0237886 A1 | 8/2014 | Taboada | |
| 2018/0027790 A1 | 2/2018 | Raymond et al. | |

\* cited by examiner (Prior Art)

DUAL RELEASE ROLLER CLIP FOR KITE FISHING

FIELD OF THE INVENTION

This invention relates to fishing line clips used in fishing, and particularly to releasable fishing line clips used in kite or drone fishing.

BACKGROUND OF THE INVENTION

Kite fishing is said to have evolved in the Pacific Islands near New Guinea many generations ago. It enables beach surf anglers to deploy lines and hooks past breakers, so that the breakers will not interfere with the hook and rigging.

Kite fishing has also been adapted to anglers using fishing vessels. Lines can be deployed at a distance from the fishing vessel. Heavier test lines and rigs can be used in a hanging orientation, which deploys less line, can keep bait near the surface in a closely regulated depth. Some believe that deploying less line, and orienting the fishing line 18 in a more vertical angle, help assure success while fishing.

Figure 1:
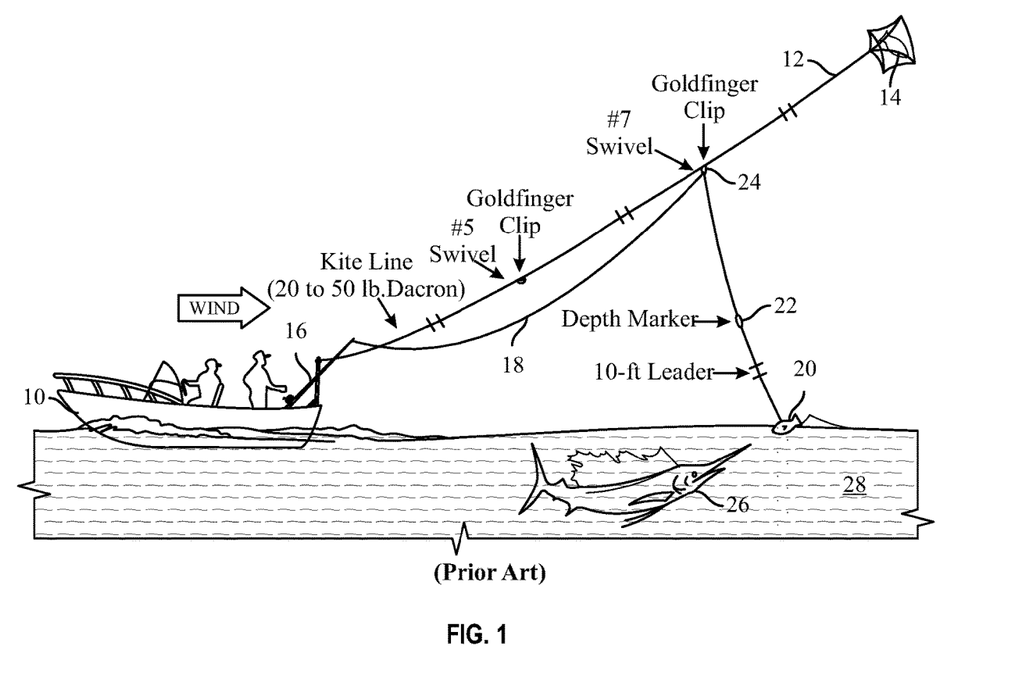
FIG. 1 is a prior art kite fishing scene using a Goldfinger Clip on a kite line.

FIG. 1 shows a prior art Kite fishing arrangement including a fishing vessel 10, a kite line 12, a kite 14, a fishing rod 16, and a fishing line 18 with a depth marker 22 and bait 20. The kite line 12 includes at least one swivel such as a #5 or #7 swivel to prevent the kite line from twisting. Preferably, the kite line is 20-50 lb rated tensile strength polyethylene terephthalate line, (e.g. Dacron™ manufactured by DuPont de Nemours, Inc.) or equivalent.

Figure 2:
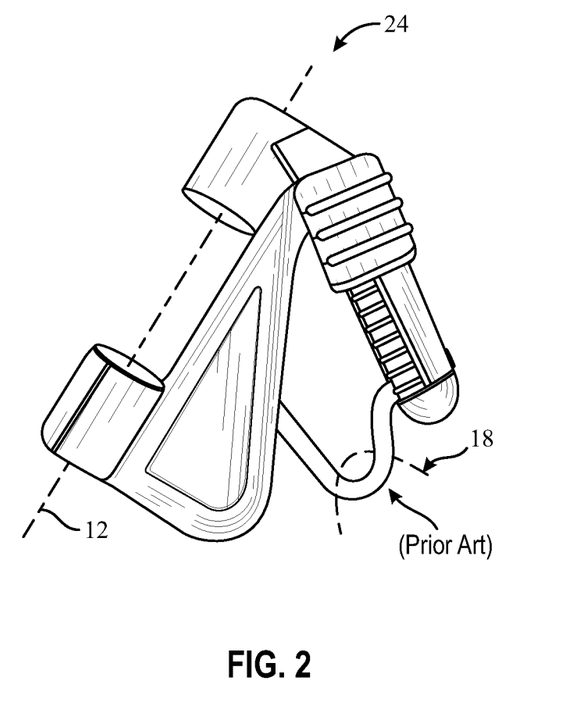
FIG. 2 is a perspective view of a prior art Goldfinger Clip.

A Goldfinger Clip 24 hangs the fishing line 18 on the kite line 12 and releases the fishing line 18 when the bait 20 is hit by a fish 26, or snag. The Goldfinger clip 24 is shown in FIG. 2 along with a kite line 12 threaded axially through the Goldfinger clip 24. Fishing line 18 is supported by a portion of the clip 24 that releases the line 18 when the line tenses due to a hit or snag.

Wind, either due to natural forces or due to movement of the fishing vessel 10, or both, lifts the kite 14, the kite line 12 including the Goldfinger clip 24 into the air to distance the bait 20 from the fishing vessel, to optimize position, depth and movement of the bait 20 in the water 28.

Some have said that kite fishing offers several advantages for those that like to use live bait for fishing. Kite fishing can closely regulate the depth of a baited fishing hook, and can distance the bait from a noisy and turbulent fishing vessel. Multiple fishing lines can be utilized simultaneously from a single kite 14 under many circumstances.

Traditionally, a fishing line is rigged through a swiveling clip on a kite line 12. The swiveling clip can be a Goldfinger clip 24 that swivels radially on a kite line 12 without causing the kite line 12 to significantly twist. The swivel attachment of the clip 24 to the kite line to maintains optimal performance of the kite line in terms of maximum load, and reliability over time. This swivel ability also aligns the latch of the Goldfinger clip to functionally align with fishing line threaded there through. When a fish hits the bait, and pulls the fishing line, the Goldfinger clip releases the fishing line from the kite line so that the kite is protected from damage.

The Goldfinger clip remains on the kite line at the same axial position on the kite line even after the fishing line 18 is released in response to a fish 26 hitting the bait 20, or a snag. Sometimes the bait is taken without hooking the fish, other times the fish is lost and escapes capture. Even if the fish is caught, the bait 20 must be reset.

In order to reset the bait 20, the kite 14 must be winched towards the fishing vessel 10 to re-attach a fishing line 18 and new bait rig to the Goldfinger clip 24. This wastes valuable time because the fishing line 18 can't be re-threaded into the Goldfinger clip while the kite remains in the air in the system shown.

What is desired is a way to maximize the time bait 20 is in the water 28 during kite fishing. What is also desired is a way to reset the bait 20 during kite fishing without needing to winch the kite 14 towards the fishing vessel 10.

SUMMARY OF THE INVENTION

A clip for attaching a fishing line to a kite line in a system as described above, or a system utilizing a drone, improves the prior art Goldfinger clip. The clip of the present invention includes a housing with a hinged top roller set hinged on the housing for receiving a kite line when the hinged roller set is in an open configuration and for holding the kite line when the hinged roller set is in a locked configuration. In the locked configuration the clip does not translate along the kite line, but does swivel to inhibit twisting of the kite line to do presence of the clip. The top roller set includes two rollers that touch and align in parallel with each other and align in parallel with an axis defined by the kite line.

A latch attaches to the housing. The latch selectively holds and releases the fishing line. The top roller set is responsive to the latch releasing the fishing line. The top roller set releases the kite line to slide away from the kite along the kite line in response to the clip releasing the fishing line.

The fishing line threads through the clip and includes bait attached to one end of the fishing line. When a fish hits the bait, or the bait is tugged with sufficient force, the tugging of the fishing line causes the clip to release the fishing line completely, and causes the clip to release the kite line enough to enable the clip to slide down the kite line away from the kite.

In a preferred embodiment, a bottom roller attached to the housing is alignable with, and axially aligns with, the kite line and the top roller. The bottom roller contacts the kite line and the top roller when the clip holds the fishing line. The bottom roller is distanced from the top roller when the clip releases the fishing line to enable the clip to slide down the kite line away from the kite during operation.

The top roller is composed of two generally cylindrical components that align in contact with each other, and that contact the bottom roller during operation. In operation the top roller's two cylindrical components contact the bottom roller to hold the clip near the kite, and to enable the clip to gently the fishing line.

The cylindrical components of the top rollers and bottom roller are manufactured from a flexible material such as marine grade neoprene, or nitrile butadiene rubber having a softness of at least 45 durometer during normal operating temperatures of between 50-100 degrees F.

The bottom roller has a single cylindrical component in a preferred embodiment of the invention. Use of a single cylindrical component is a simple design that enables improved reliability.

In one embodiment of the invention, the single cylindrical component of the bottom roller is manufactured from a marine grade nitrile butadiene rubber and has a softness within the range of 45 to 100 durometer in operating temperatures of between 50-100 degrees F.

The bottom roller and the cylindrical components of the top roller have radial rings that extend along the full length of both the bottom roller and the cylindrical components of the top roller. The radial rings are effective at gripping a kite line to inhibit axial movement of the bottom roller and the cylindrical components of the top roller on the kite line during operation where the clip suspends the fishing line in the air near the kite.

The bottom roller and the cylindrical components of the top roller each rotate on a respective axis to enable the clip to spin on a kite line at an axial position with respect to the kite line without significantly changing the axial position. The use of rotatable rollers prevents twisting of the kite line without enabling axial movement of the clip on the kite line during operation where the clip suspends the fishing line in the air near the kite. The use of rotatable rollers advantageously limits twisting of the kite line when the clip releases the fishing line and slides down the kite line away from the kite.

DETAILED DESCRIPTION

Figure 3:
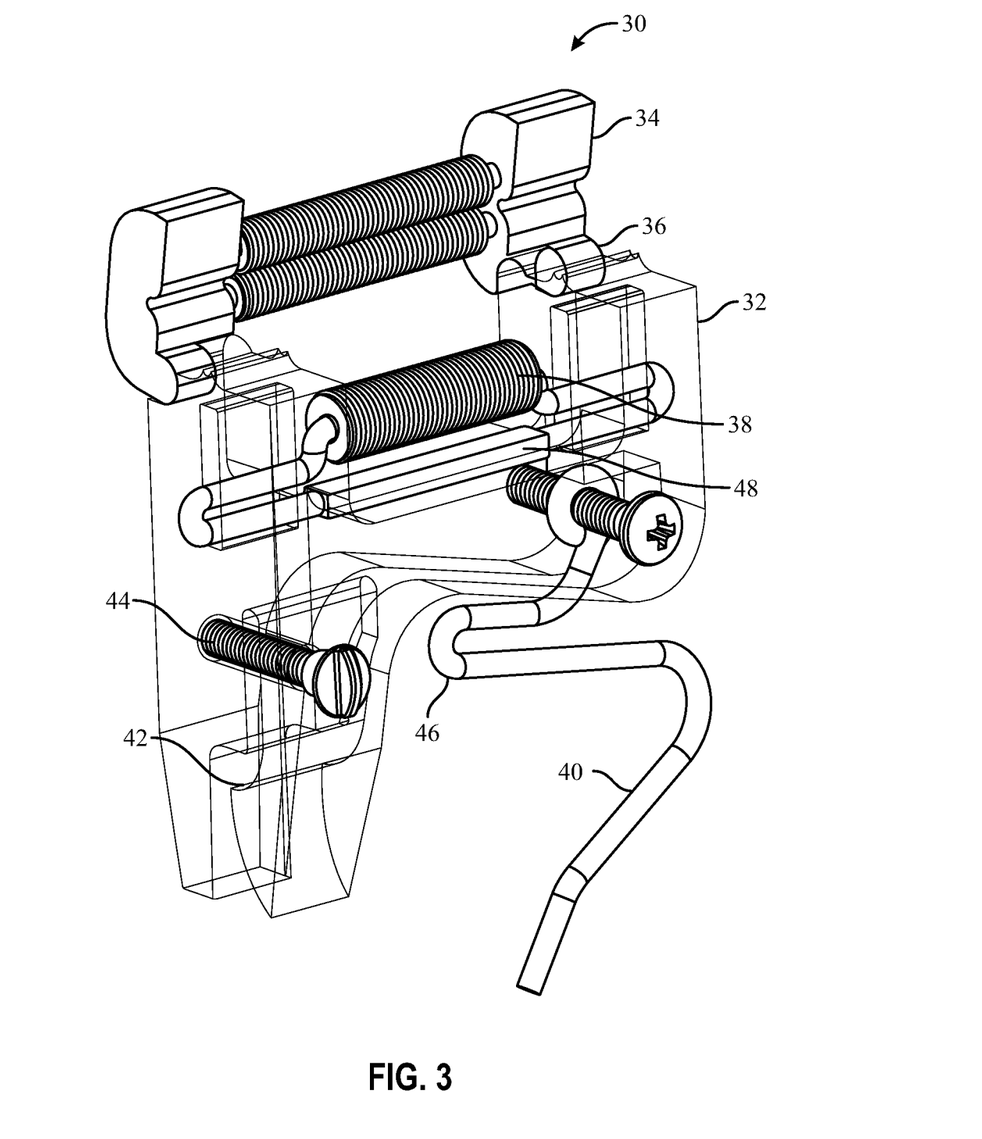
FIG. 3 is perspective view of the present invention with a transparent housing and a clip latch in a released orientation.

FIG. 3 is a perspective view of the clip of the present invention generally designated with the reference numeral 30. The clip 30 includes a housing 32 (shown in a transparent view). The housing 32 includes a hinged top roller set 34 attached to the housing with a hinge 36 and moveable from an open configuration for receiving a kite line, to a closed configuration for holding a kite line.

The housing 38 holds a bottom roller 38 that is moveable to contact the top roller set 34 when the top roller set is in the closed configuration to enable holding of the kite line. Cooperation of the top roller set 34 and the bottom roller 38 enables selective attachment of the present invention to a kite line and inhibits translation of the clip 30 along the kite line during normal operation. Releasing the bottom roller 38 from the top roller set 34 enables translation of the clip 30 on a kite line. Moving the hinged top roller set 34 to the open configuration shown enables removal of the clip 30 from the kite line.

Preferably, release of the bottom roller 38 from the top roller set 34 is accomplished by movement of the latch 40 from a locked configuration where the latch 40 engages the lock groove 42, to a released configuration as shown where the latch 40 disengages from the lock groove 42.

Figure 4:
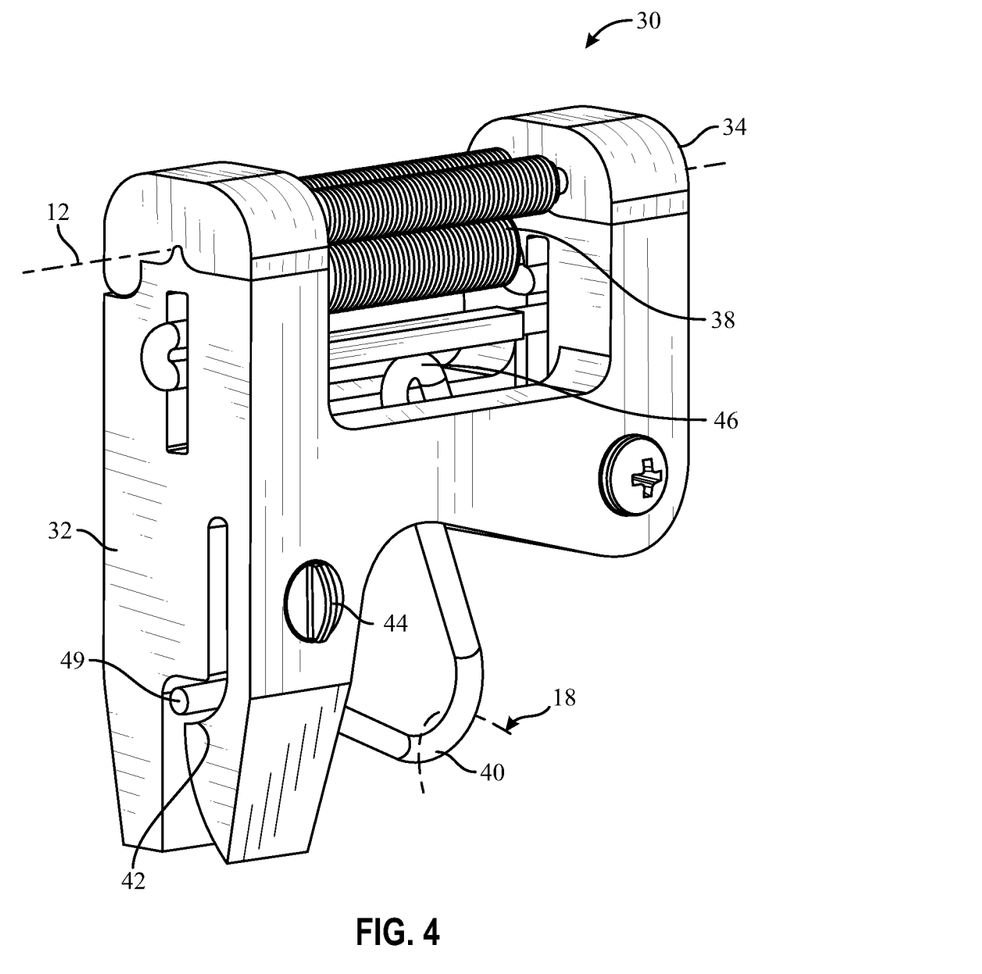
FIG. 4 is a perspective view of the present invention with a clip latch in a locked orientation.

The housing 32 further includes a threaded adjustor 44 that can be hand adjusted to regulate pressure required for releasing the latch 40 from the lock groove 42. Twisting the threaded adjustor 44 selectively increases or decreases pressure applied by the lock groove 42 and the housing on the latch 40 when the latch 40 is in the locked configuration. Locking the latch 40 in the locked configuration also presses the elbow 46 of the latch 40 against the bottom roller assembly 48 to guide the bottom roller 38 towards the top roller set 34 during operation FIG. 4 shows the clip 30 of the present invention. The top roller set 34 is hinged to a closed configuration to attach the clip 30 to the kite line 12. The bottom roller 38 presses against the kite line 12 and the top roller set 34 due to contact with the elbow 46 of the latch 40. The latch 40 locks in the lock groove 42 of the housing 32 to loosely support the fishing line 18.

The contact between the top roller set 34 and the bottom roller 38 holds the kite line 12 and prevents the clip 30 from translating along an axis defined by the kite line 12. The top roller set 34 and the bottom roller 38 are freely rotatable to enable the clip 30 to freely swivel about the kite line 12 to inhibit or prevent twisting of the kite line due to presence of the clip.

The top roller 34 enables the clip to swivel on the kite line 12 when the top roller 34 grips the kite line 12 so that the latch 40 aligns in a consistent vertical orientation to consistently enable release of the latch 40 in response to tension of a fishing line 18 when it is snagged or when the bait on the fishing line is hit by a fish.

Rotation of the threaded adjuster 44 deforms the housing 32 at the lock groove 42 to selectively hold an end 49 of the latch 40 in the engaged configuration with the lock groove 42. It should be appreciated that the threaded adjuster 44 can be modified in any way to selectively release the latch 40 in response to tension applied by the fishing line 18 in various alternative aspects of the invention.

Importantly, it should be appreciated that the combination of the swivel movement, which hangs the latch 40 in a generally vertical orientation with respect to water, and the use of the threaded adjuster 44 results in a consistent release functionality without causing the fishing line or kite line to break.

Figure 5:
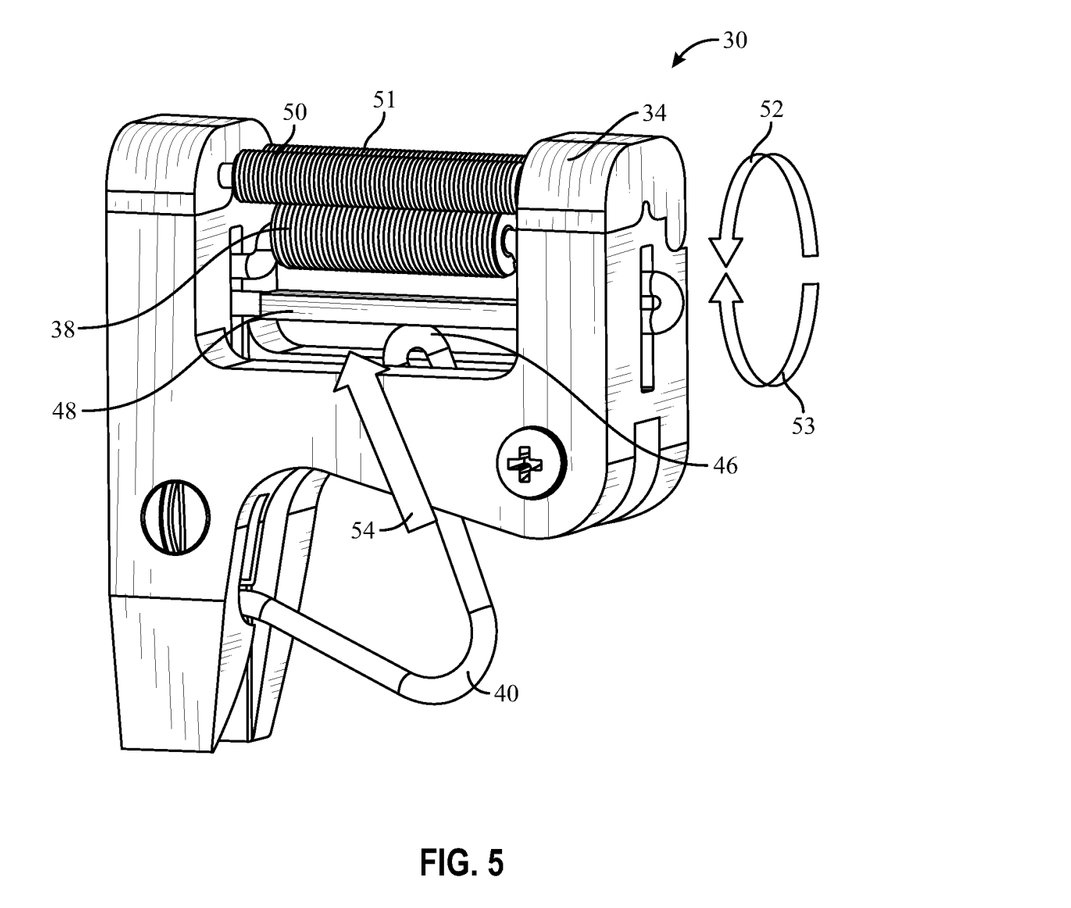
FIG. 5 is a perspective view of the present invention with arrows indicating the direction of movement of a distal portion of the clip latch, and rotation of the rollers.

FIG. 5 shows the clip 30 where rollers 50 and 51 of the top roller set 34 rotate in the direction of the arrow 52 to enable the clip 30 to swivel on a kite line. The bottom roller 38 rotates too in the direction of the arrow 53. It can be appreciated that the rollers 50 and 51 are distant from each other and contact the roller 38 to enable free swivel motion of the clip 30 about a kite line. Contact between the rollers 50 and 51, and the bottom roller 38 enable annular grooves formed on each roller 50, 51 and 38 to mesh to hold any kite line and inhibit translation of the clip 30 on the kite line.

Locking the latch 40 in the closed configuration urges the elbow 46 of the latch 40 against the bottom roller assembly 48 to press the bottom roller 38 against the top roller set 34.

Figure 6:
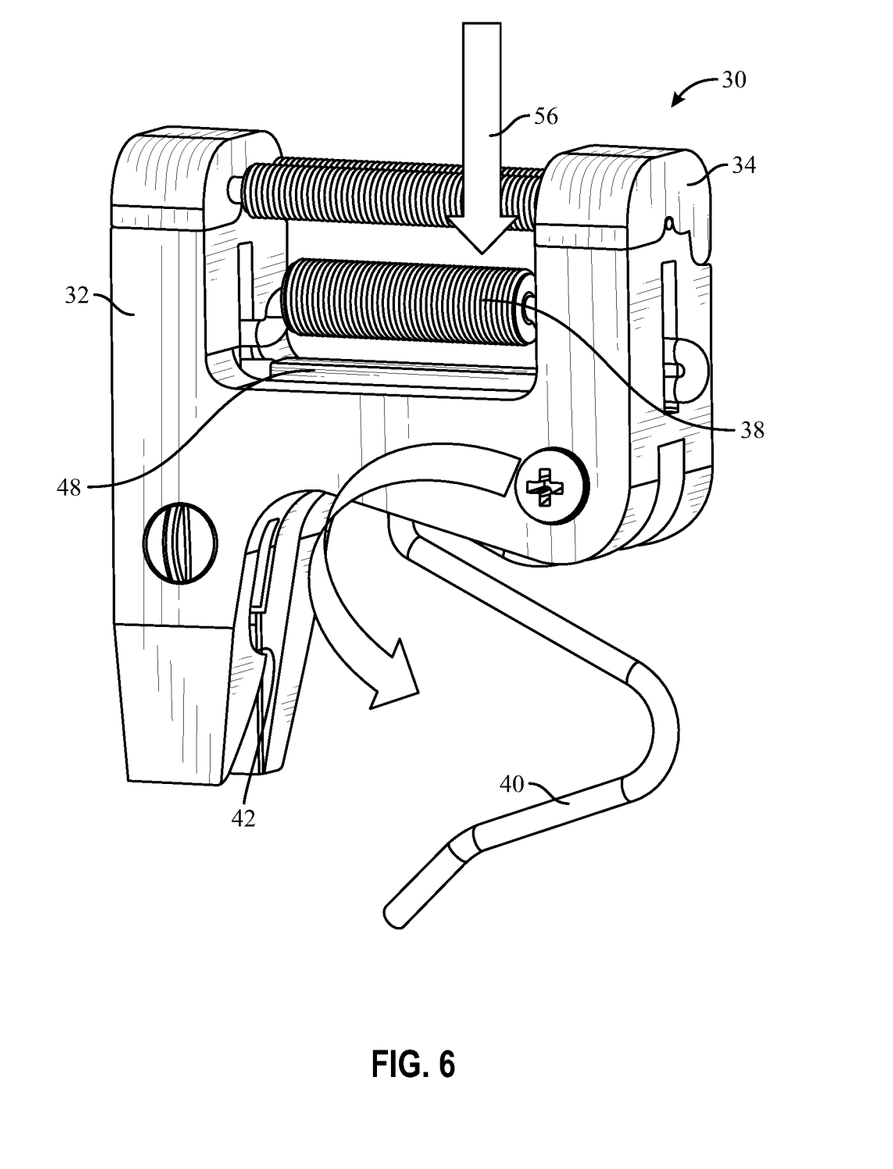
FIG. 6 is a perspective view of the present invention with arrows indicating the direction of movement of a proximal portion of the clip latch during release, and radial separation of the rollers.
Figure 7:
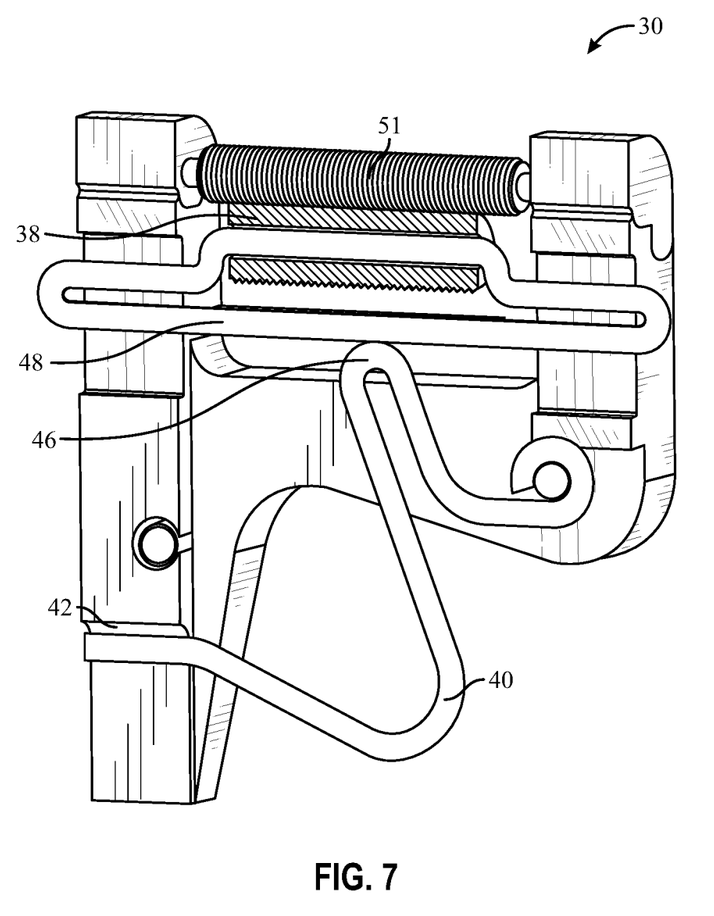
FIG. 7 is a cross-sectional view of the present invention showing shapes of the clip latch and the roller assembly.

FIG. 6 shows the release of the latch 40 from the lock groove 40 of the housing. This release moves the elbow 46 (FIG. 5) of the latch 40 away from the bottom roller assembly 48 in the direction of the arrow 56. The bottom roller 38 also moves in the direction of the arrow 56 in response to movement of the latch 40 to release contact from the top roller set 34. This movement simultaneously releases any fishing line 18 (FIG. 4) from the latch 40 and releases the kite line from the top roller set 34 and the bottom roller 38 to allow the clip to slide to translate along kite line towards the fishing vessel to enable re-loading of the clip 30 with a fresh fishing line, or removal of the clip 30 from the kite line. FIG. 7 shows a cross sectional view of the clip 30 having the top roller 51 engaged with the bottom roller 38 in a configuration to hold a kite line. The latch 40 locks in the lock groove 42 and the elbow 46 of the latch 40 presses against the lower roller assembly 48 to hold the lower roller 38 against the top roller 51.

Figure 8:
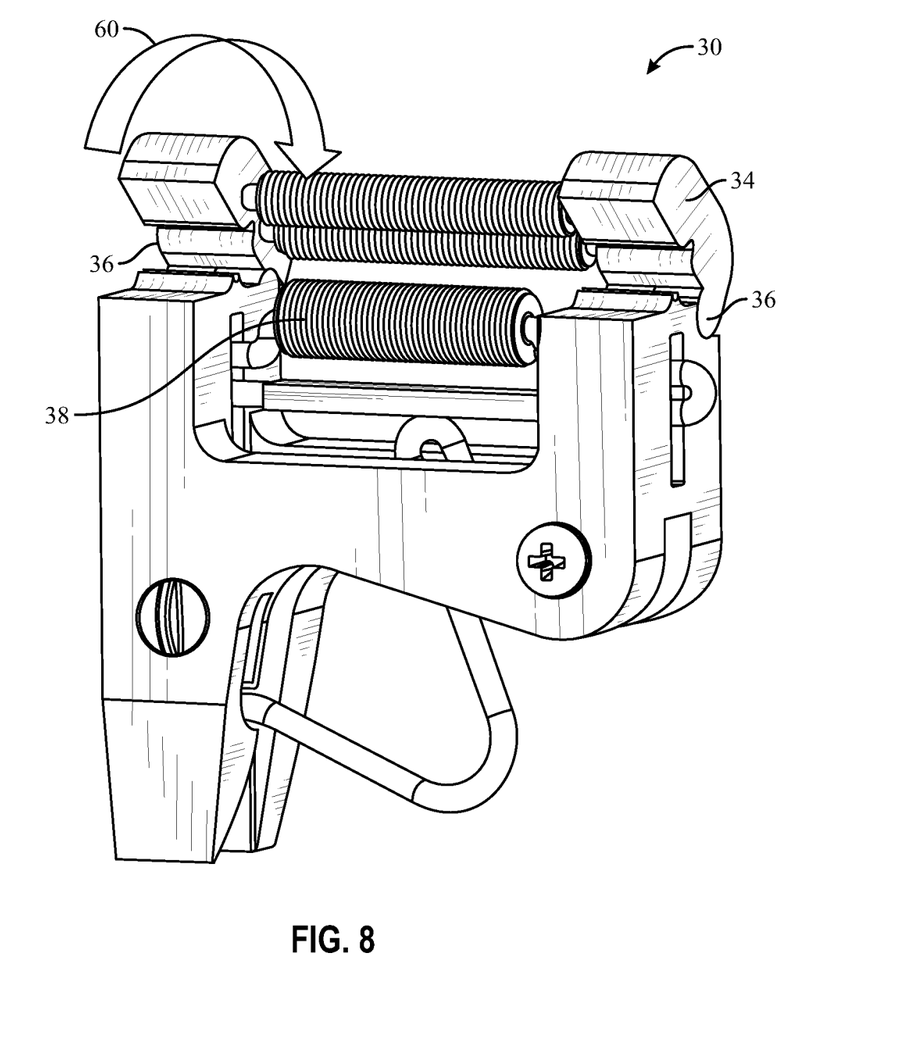
FIG. 8 is a perspective view of the present invention with the top rollers hinged.

FIG. 8 shows the clip 30 with the top roller set 34 rotating in the direction of the arrow 60 on the hinges 36 to release a kite line from between the top roller set and the bottom roller 38.

While the present invention is disclosed by way of various examples set forth above, the true scope of the invention is defined by the appended claims. The invention should be understood so that the term "Kite" is any tethered flying device, including a drone. The invention can also be practiced using the clip with an untethered drone. While the invention is disclosed in terms of kite fishing, it can also be used with drone delivery technology to enable safety for the drone device when carrying a package with a line, or lines.

The rollers can have various designs and materials for holding kite lines of various strengths, for example. The annular rings can be replaced by helical or other patterns, although presently the annular rings mate between the bottom roller and top roller sets and seem to function better than other options. The threaded adjuster can be replaced by a battery powered system including piezoelectric sensors and releasing devices. Alternatively a remote-controlled release is possible, either manually actuated or automatically actuated using sensors and wireless communications, for example.

I claim:

1. A clip for attaching a fishing line to a kite line, comprising:
    a housing;
    a top roller set hinged to the housing for receiving the kite line;
    a latch mounted on the housing for receiving the fishing line, the latch is moveable between a locked configuration that is capable of loosely holding the fishing line, and an unlocked configuration that is capable of fully releasing the fishing line;
    the fishing line has at least one hook for holding bait and hooking a fish; and
    a bottom roller that is adjustably distanced from the top roller set in response to locking and unlocking the clip, at least one of the bottom roller and top roller set are manufactured from marine grade nitrile butadiene having a softness within the range of 45-100 durometer to enable the bottom roller and the top roller set to grip the kit line sufficiently to normally suspend the fishing line with the hook and the bait on the latch;
    the latch releases the fishing line when the bait is hit by the fish.

2. The clip as set forth in claim 1, wherein the top roller set has two generally cylindrical rollers having annular rings, the two generally cylindrical rollers align in parallel with each other for gripping the kite line, which normally inhibits translation of the clip on the kite line when the latch suspends the fishing line with the hook and bait.

3. The clip as set forth in claim 2, wherein cylindrical components of the top roller set enables the clip to swivel on the kite line when the top roller grips the kite line.

4. The clip as set forth in claim 1, wherein bottom roller has a single roller having annular gripping rings for contacting the top roller set and the kite line.

5. The clip as set forth in claim 1, wherein the latch distances the top roller set from the bottom roller in the unlocked configuration.

6. The clip as set forth in claim 1, wherein the latch presses the bottom roller towards the top roller set in the locked configuration.

7. The clip as set forth in claim 1, wherein the housing includes a lock groove for receiving the latch in the locked configuration, the housing further includes a threaded adjuster threadably attached to the housing for adjustably releasing the latch.

8. The clip as set forth in claim 2, wherein the bottom roller and the two cylindrical top rollers have radial rings that extend along the full length of the bottom roller and the two cylindrical top rollers.

9. The clip as set forth in claim 8, wherein the bottom roller and the two cylindrical top rollers each rotate on a respective axis to enable the clip to swivel on the kite line without significantly translating relative to the kite line.

* * * * *